United States Patent [19]

Zucker et al.

[11] Patent Number: 4,849,849

[45] Date of Patent: Jul. 18, 1989

[54] APPARATUS FOR DETECTING MALFUNCTIONS OF AN ELECTRICAL DEVICE, AND METHODS OF CONSTRUCTING AND UTILIZING SAME

[75] Inventors: Myron Zucker, Bloomfield Hills; Ronald G. Jawernycky, Farmington Hills, both of Mich.

[73] Assignee: Myron Zucker, Inc., Royal Oak, Mich.

[21] Appl. No.: 110,115

[22] Filed: Oct. 19, 1987

[51] Int. Cl.$^4$ .......... H02H 3/24

[52] U.S. Cl. .......... 361/92; 361/93; 361/84

[58] Field of Search .......... 361/87, 93, 92, 16, 361/86, 88; 340/663, 664; 307/131, 170; 323/223, 226

[56] References Cited

U.S. PATENT DOCUMENTS

| | | | |
|---|---|---|---|
| 3,875,464 | 4/1975 | Gary et al. | 340/664 X |
| 4,425,541 | 1/1984 | Burkum et al. | 324/548 |
| 4,434,401 | 2/1984 | York | 324/158 SC |
| 4,510,549 | 4/1985 | Tedesco | 361/92 X |
| 4,536,704 | 8/1985 | Burkum et al. | 324/52 |
| 4,540,935 | 9/1985 | Burkum et al. | 324/52 |
| 4,541,029 | 9/1985 | Ohyama | 361/87 X |

OTHER PUBLICATIONS

Information Data Packet from Smith Research & Technology, Inc., Mar. 1988.

*Primary Examiner*—Derek S. Jennings
*Attorney, Agent, or Firm*—Irving M. Weiner; Joseph P. Carrier; Robert M. Petrik

[57] ABSTRACT

Apparatus for detecting malfunctions of an electrical device comprises a current transformer, connected to the electrical device a current-sensitive switch connected to the current transformer, a power supply connected to the current sensitive switch, and an indicator connected between the switch and a power supply. The switch is adapted to be switched on and prevent the indicator from being actuated by the power supply while the energy in the electrical device is greater than or equal to a predetermined level, and is adapted to be switched off and permit the indicator to be actuated by the power supply while the energy in the electrical device is less than the predetermined level.

17 Claims, 2 Drawing Sheets

APPARATUS FOR DETECTING MALFUNCTIONS OF AN ELECTRICAL DEVICE, AND METHODS OF CONSTRUCTING AND UTILIZING SAME

BACKGROUND OF THE INVENTION

1. Field of the Invention

The invention relates generally to an electrical circuit for detecting malfunctions of an electrical device, and methods of constructing and utilizing same. More particularly, the present invention pertains to an electrical circuit for detecting when an electrical device loses current, and for providing an indication or alarm of such malfunction.

2. Description of the Relevant Art

In the art it is often desirable to know when electrical devices have malfunctioned so that the defective devices can be repaired or replaced. For this purpose, it is known to use indicators in cooperation with the electrical devices to indicate when the devices have malfunctioned, whereby maintenance personnel can quickly diagnose and fix electrical problems.

In this regard, known indicators have been constructed which receive a current when the monitored electrical device has malfunctioned, which current is then used to power an indicator light or the like. As an example, one of applicant's prior inventions, sold under the trademark CAL-LITE, is such an indicator light. The CAL-LITE device has been used in cooperation with power capacitor assemblies by being placed in parallel with the fuses associated with the capacitor assemblies. In the event a capacitor assembly fails it would short-circuit, thereby blowing the fuse or fuses connected thereto, and thereby also providing a driving current to the CAL-LITE indicator or indicators.

However, a new generation of electrical devices, called "metallized", have emerged in recent years which do not short-circuit upon failure. As an example, a conventional capacitor includes two metallic foil layers (or plates) separated by a film (polypropolene) layer and a sheet of paper insulation, whereas a metallized capacitor simply includes a film or paper substrate having thin metal coatings deposited on opposite sides thereof. In the conventional capacitor a short-circuit develops across the two metallic layers if there is a breakdown in the paper insulation, and this short circuit blows the fuse(s) associated with the capacitor. On the other hand, the metal coatings in the metallized capacitor are very thin, whereby they simply vaporize in a small area if a fault develops through the substrate. Thus, once the metallized coatings vaporize in the metallized capacitor, the current path will be gone, and the fault will be extinguished. This phenomenon is known as "self-clearing". It is common to all metallized capacitors, wet, "damp" or dry.

The momentary fault current that occur in a metallized capacitors is too small to constitute a short-circuit by fuse standards. Thus, previous indicators, such as CAL-LITE, cannot be used to indicate when a metallized capacitor has experienced such momentary faults because the fuses have not been blown and, correspondingly, no power is supplied to the indicators.

As a protection for metallized capacitors, pressure-actuated interrupters, as shown at 8 in FIGS. 1–3, are provided therewith. If the capacitor experiences many self-clearings within a short span of time, the self-clearings develop enough gas pressure to make the capacitor cell bulge. This causes the pressure-actuated interrupter 8 to open, as shown in FIG. 3, which takes the capacitor cell off line. This is a normal end-of-life sequence for a metallized capacitor assembly, and results in an open circuit. Again, however, conventional indicators such as CAL-LITE cannot be used to indicate that the capacitor has gone off line because there is an open circuit, whereby no current is supplied to the indicator to actuate it.

Similar problems exist in relation to other electrical devices.

Hence, there is a need in the art for an indicator which can indicate when electrical devices, such as metallized-type electrical devices, have malfunctioned by detecting a loss or reduction of current in the electrical devices.

SUMMARY OF THE INVENTION

The present invention has been developed to fulfill the above-discussed need for an indicator which can be used to indicate malfunctions of electrical devices, including but not limited to metallized-type electrical devices. More particularly, the present invention has been developed to provide an indicator which responds to a loss of current, in contrast to conventional indicators which respond to a presence of current. Hereinafter, it will be understood that the phrase "loss of current" applies not only to a literal loss of current, but also a reduction in current below a predetermined normal or minimum current value.

According to the present invention, there is provided an apparatus for detecting malfunctions of an electrical device, comprising a current transformer, a currentsensitive switching means connected to the current transformer, an indicating means connected to the switching means, and a power supply. The current transformer includes a primary placed in series with the electrical device. The switching means is adapted to actuate the indicating means when the electrical device loses current.

It is an object of the present invention to provide a simple detecting apparatus which can indicate a malfunction in an electrical device by responding to loss of current in the electrical device.

Other objects, advantages and salient features of the present invention will become apparent from the following detailed description, which, when taken into conjunction with the annexed drawings discloses preferred embodiments of the present invention.

BRIEF DESCRIPTIONS OF THE DRAWINGS

FIG. *6a* is a circuit diagram of a second embodiment of a detecting apparatus according to the present invention, while FIG. *6b* is a circuit diagram of a power supply for the circuit shown in FIG. *6a*.

Figure 7:
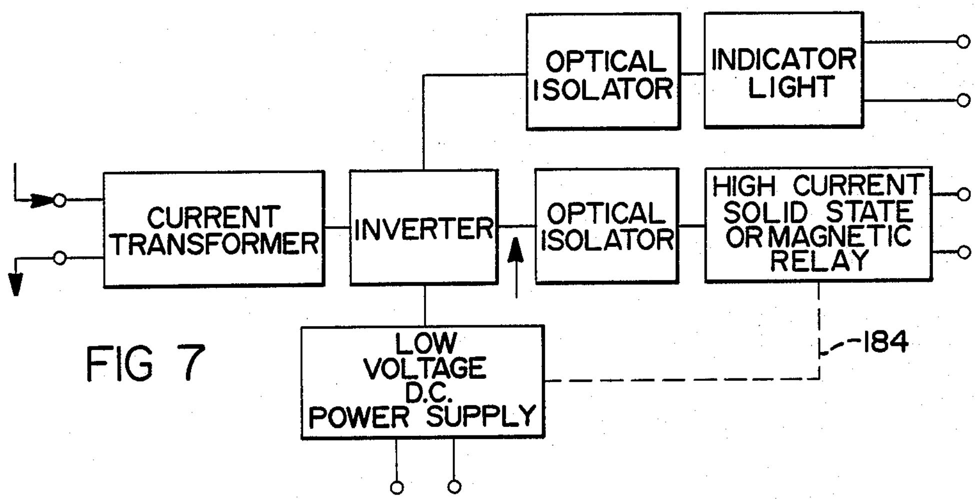

FIG. 7 is a block diagram of the circuits shown in FIGS. *6a* and *6b*.

Figure 4:
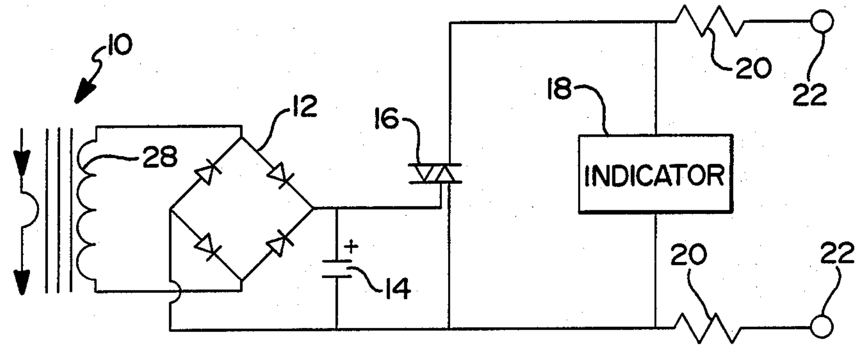
FIG. 4 is a circuit diagram of a first embodiment of a detecting apparatus according to the present invention.
Figure 8:
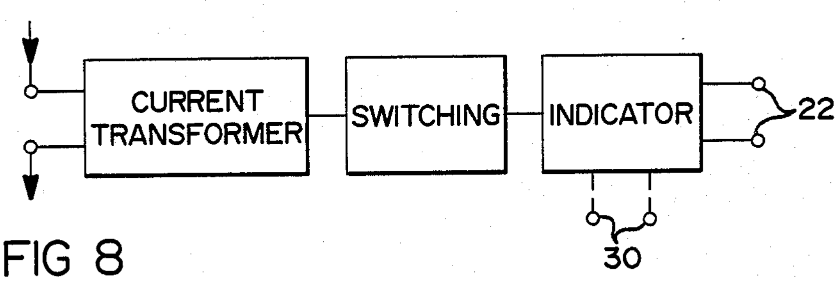

FIG. 8 is a block diagram of the circuit shown in FIG. 4.

DETAILED DESCRIPTION OF PREFERRED EMBODIMENTS

Figure 1:
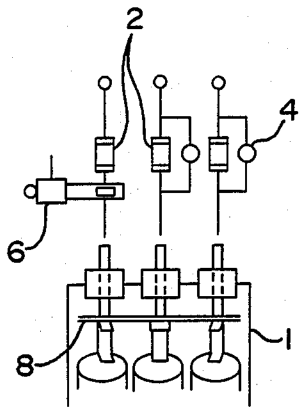
FIGS. 1–3 show a power capacitor assembly equipped with both conventional indicator lights and a detecting apparatus according to the present invention.
Figure 2:
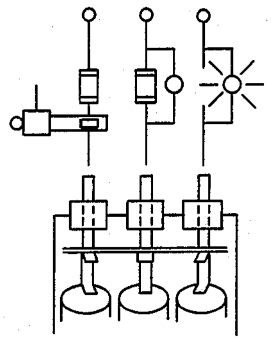
Figure 3:
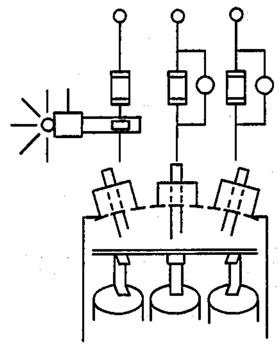

Referring to FIGS. 1–3, there is depicted a power capcaitor assembly equipped with fuses and indicator lights. The capacitor assembly itself is generally indicated at 1, the fuses are indicated at 2, conventional indicator lights such as CAL-LITE devices are indicated at 4, and an indicator light according to the present invention is indicated at 6. As discussed above, the capacitor cell assembly also includes a pressure-actuated interrupter, which is indicated at 8.

FIG. 1 represents the power capacitor assembly during normal working conditions. Such normal working conditions include the occasional occurrence of faults which are self-cleared by the capacitor assembly. As discussed above, normally occurring faults are not sufficiently strong to blow the fuses.

FIG. 2 represents the power capacitor assembly after a severe voltage spike. The severe spike will puncture the capacitor substrate just as in a conventional foil/paper/film type capacitor, but the metallized capacitor clears and recovers with only a minuscule loss of capacitance. This is another advantage which has led the capacitor industry to a widespread acceptance of metallized capacitors. Unfortunately, the fuses 2 are as sensitive to the spikes as always, and may blow when it would not be required for the capacitor's sake. The actuated indicator light 4 serves as a warning to maintenance personnel that the fuse 2 should be replaced.

FIG. 3 represents the power capacitor assembly after the pressure-actuated interrupter 8 has opened due to excessive pressure being built up within the assembly from many self-clearings of the metallized capacitor. In this situation, the power capacitor assembly has come to the end of its useful life and is effectively taken off line by the interrupter 8, resulting in an open circuit. As shown, the conventional indicator lights are not actuated because there is no longer any current flowing through the line. On the other hand, the indicator 6 according to the present invention is actuated because it responds to loss of current in the capacitor. Thus, maintenance personnel can quickly recognize that the power capacitor assembly has failed and appropriately replace it with a new assembly.

As shown in FIGS. 1–3 the indicator 6 according to the present invention is placed in series with the power capacitor assembly and the fuse 2, whereas the conventional indicators 4 are placed in parallel with the fuses 2. Thus, the indicator 6 would also be actuated if the fuse 2 above in series with it were blown by a severe voltage spike, again because there would be a loss of current in the line. In this situation, the maintenance personnel would be made aware of a problem by the indicator 6, and could quickly diagnose that the problem simply involved the fuse 2.

Referring to FIG. 4, there is shown a circuit diagram of a first embodiment of an indicator according to the present invention. This circuit includes a current transformer 10, a bridge rectifier 12, a capacitor 14, a current-sensitive switching device 16, an indicator means 18, a pair of resistors 20, and contacts 22 which are connected to an appropriate voltage supply.

Figure 5:
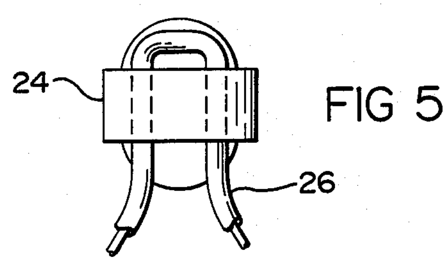
FIG. 5 is an enlarged view of a sensing loop portion of the detecting apparatus according to the first embodiment.

The current transformer 10 is preferably of a miniature variety. As shown in FIG. 5, a core 24 of the transformer has an opening or window formed therein, and a primary 26 of the transformer extends into the opening. The primary 26 functions as a sensing loop for an electrical device being monitored, and is placed in series with the electrical device. The number of turns of the primary 26 is selected depending on the current load of the electrical device, as shown in Table I below. In operation, a given voltage level or threshold is required to keep the switching device 16 switched on during normal operation of the monitored electrical device, and the number of turns of the primary 26 will be selected so as to establish the given voltage based on the current load of the electrical device.

TABLE I

| Nominal current | Turns of Primary* |
|---|---|
| 18.0 amps | ½ |
| 16.8 amps | ½ |
| 15.6 amps | ½ |
| 14.4 amps | ½ |
| 12.0 amps | 1 |
| 9.6 amps | 1 |
| 8.4 amps | 1 |
| 7.2 amps | 1 |
| 6.0 amps | 1.5 |
| 4.8 amps | 2 |
| 3.6 amps | 2.5 |
| 2.4 amps | 3 |

*Power input at contacts 22 = 240 v A.C., resistors 20 are 68k ohms, 1 watt 600 v rated Although Table I indicates the primary 26 as having ½–3 turns, the primary 26 could have any appropriate/desired number of turns depending on current load. Also, the number of turns of primary 26 would vary for different power inputs at the contacts 22, and for different value resistors 20.

A secondary 28 of the transformer 10 is wound around the core 24 and is connected to the bridge rectifier 12. The number of turns of the secondary 28 is preferably in the range of 500–2000. Again, however, the number of turns of the secondary can be chosen to be any appropriate/desired value.

The current-sensitive switching device 16 is a very important portion of the circuit, and functions to permit the the indicator means 18 to be actuated by the AC input at contacts 22 when there is a loss of current in the monitored electrical device. Preferably, the current-sensitive switching device 16 will be a sensitive gate triac which can be turned on or kept on by very low currents. For example, a sensitive gate triac can be turned on or kept on by as little as five milliamps.

The indicator means 18 can be any desired type of indicator, including a simple indicator light, an audio alarm, a combination of audio and visual indicators, etc. If it is desired to use a combination of indicators, a preferred arrangement for doing so would be to place a first indicator (such as a neon light) at 18 in FIG. 4, and then connect a high sensitivity relay in parallel with the first indicator, the relay actuating a second indicator (such as a siren or bell) in unison with the first indicator. The high sensitivity relay would have a pair of high current switching contacts (such as indicated at 30 in FIG. 8) connected to the second indicator.

The resistors 20 preferably have the same value, which is selected in dependence on the power input at contacts 22. For example, if the power input is 480 v A.C. the resistors 20 could have a value of 100 k ohms, 1 watt, and if the power input is 240 v A.C. the resistors 20 could have a value of 68 k ohms, 1 watt. Again, however, the resistors 20 can be selected to have any appropriate/desired value. Note, it is possible to use only one of the resistors 20, but it is preferable to use two, as shown, for safety purposes.

As shown, the entire circuit in FIG. 4 is preferably solidstate. Also, the entire circuit is preferably potted together, with the transformer on top for convenience and simplicity in handling.

Referring to FIGS. *6a* and *6b* there is shown a circuit diagram of a second embodiment of the present invention. This embodiment performs the same function as the embodiment shown in FIG. 4, but specifically includes two indicators or alarms. Relatedly, FIG. 7 is a block diagram of the circuit shown in FIGS. *6a* and *6b*.

In FIG. *6a*, the current transformer 110 and bridge rectifier 112 have substantially the same structure as the current transformer 10 and the rectifier 12 in the circuit of FIG. 4. The circuit in FIG. *6a* then comprises an inverter means, including transistors 132, 134, resistors 136-146 and an input terminal 148 for a low voltage, DC power supply, which is shown in FIG. *6b*. The inverter means has a straight output to a first indicator portion of the circuit, including indicator light 118, and an inverted output to a second indicator portion, which includes output contacts 182. The first indicator portion of the circuit in FIG. *6a* is similar to the current-sensitive switching device and indicator means shown in FIG. 4, except that it includes a resistor 152 before current-sensitive switching device (triac) 116, and in that is includes only a single transistor 120 associated with power input contacts 122. As with the first embodiment, the value of the resistor 120 will be selected in dependence on the value of the power input. For example, if the power input is 480 volts AC the resistor 120 could have a value of 300 k ohms, 3 watts.

Also shown is an opto-isolator 150 which functions as a safety device. The opto-isolator 150 establishes a zero crossing to stop electromotive induction.

The second indicator portion of the circuit shown in FIG. *6a* includes a second current-sensitive switching device (triac) 160, a variable resistor 162, a pair of resistors 164, 166, and output contacts 182. As discussed above, the contacts 182 would be connected to a second indicator, such as a siren or bell. The resistor 166 functions to prevent false triggering of the triac 160. The variable resistor 162 could be replaced by other appropriate components, such as a conventional resistor and a capacitor placed in series, the value of these two elements being selected to provide an appropriate power output supply.

A second opto-isolator (safety device) 168 is placed between the inverter means and the second indicator portion.

Although the second indicator portion of the circuit in FIG. *6a* is depicted as a solidstate relay, it could be replaced by any appropriate switching device. For example, the second indicator portion could be a magnetic relay. In this event, however, the low voltage DC supply of FIG. *6b* would have to be connected to the magnetic relay also, as shown by the dotted line 184 in FIG. 7.

Figure 6A:
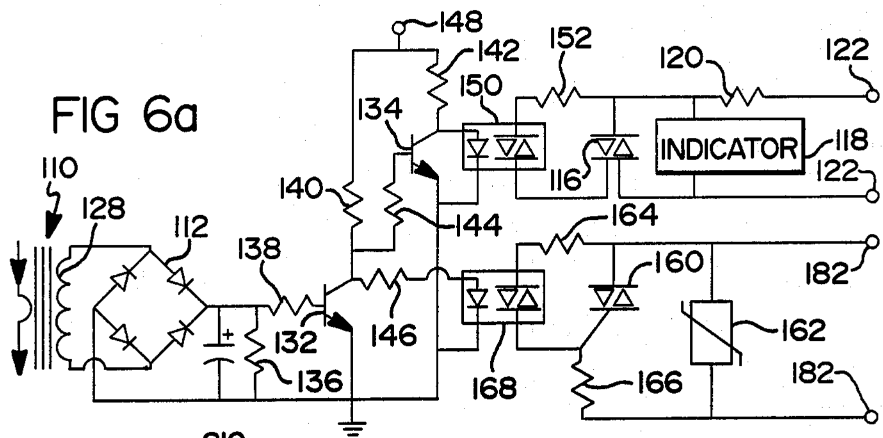
Figure 6B:
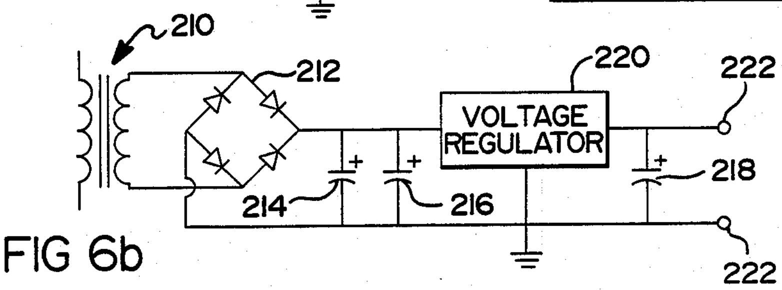

Referring to FIG. *6b* there is shown a circuit diagram for a low voltage DC power supply for the inverter means, and possibly also the magnetic relay portion, of the circuit shown in FIG. *6a*. The circuit in FIG. 6b includes a current transformer 210, a bridge rectifier 212, capacitors 214-218, a voltage regulator 220, and contacts 222. The primary of the transformer 210 would be connected to an appropriate power supply, such as 480 v AC.

Although there have been described what are at present considered to be the preferred embodiments of the present invention, it will be understood that the invention can be embodied in other specific forms without departing from the spirit or essential characteristics thereof. The described embodiments are, therefore, to be considered in all aspects as illustrative, and not restrictive. The scope of the invention is indicated by the appended claims rather than the foregoing description.

We claim:

1. Apparatus for detecting malfunctions of an electrical device, comprising:

inductive means connected to an electrical device and providing an input signal indicative of electrical energy in the electrical device;

switching means connected to said inductive means and receiving said input signal therefrom;

an independent power supply means connected to said switching means; and indicating means connected between said switching means and said power supply means;

said switching means being adapted to be switched on and prevent said indicating means from being actuated by said power supply means while the electrical energy in said electrical device is greater than or equal to a predetermined level, and said switching means being adapted to be switched off and permit the indicating means to be actuated by said power supply while the electrical energy in said electrical device is less than said predetermined level.

2. Apparatus according to claim 1, wherein:

said inductive means is a current transformer having a primary thereof placed in series with the electrical device;

said switching means is a current sensitive switching means comprising a sensitive gate triac; and said predetermined level corresponds to a number of turns in the primary of said current transformer.

3. Apparatus according to claim 2, wherein:

said apparatus further comprises an input signal conditioner connected between said inductive means and said switching means for conditioning said input signal;

said switching means being directly connected to said input signal conditioner and functioning in dependence on a conditioned input signal received therefrom.

4. Apparatus according to claim 3, wherein:

said current sensitive switching means further comprises a capacitor connected in parallel between said input signal conditioner and said sensitive gate triac.

5. Apparatus according to claim 4, wherein:

said power supply is an A.C. power line;

said apparatus further comprises resistor means connected directly between said A.C. power line and said indicator means, said resistor means having a value corresponding to a value of current in the A.C. power line.

6. An apparatus according to claim 5, wherein:

said indicating means comprises an indicator light.

7. An apparatus according to claim 5, wherein said indicating means comprises an audible alarm.

8. An apparatus according to claim 5, wherein:

said indicating means comprises both an indicator light and an audible alarm.

9. An apparatus according to claim 8, wherein:

said indicator light and said audible alarm are arranged in parallel and interconnected by a high sensitivity relay.

10. Apparatus for detecting malfunctions of an electrical device, comprising:

inductive means connected to an electrical device and prodiving an input signal indicative of electrical energy in the electrical device;

inverter means connected to said inductive means and receiving said input signal therefrom;

switching means connected to said inverter means;

an independent power supply means connected to said inverter means and said switching means; and indicating means connected between said switching means and said power supply means;

said switching means being adapted to be switched on and prevent said indicating means from being actuated by said power supply means while the electrical energy in said electrical device is greater than or equal to a predetermined level, and said switching means being adapted to be switched off and permit the indicating means to be actuated by said power supply means while the electrical energy in said electrical device is less than said predetermined level.

11. Apparatus according to claim 10, wherein:

said apparatus further comprises an input signal conditioner connected between said inductive means and said inverter means for conditioning said input signal;

said inverter means being substantially directly connected between said input signal conditioner and said switching means.

12. Apparatus according to claim 11, wherein:

said inductive means is a current transformer having a primary thereof placed in series with said electrical device, and a number of turns in said primary corresponds to said predetermined level;

said indicating means includes a first indicator and a second indicator;

said switching means comprising a first switching device connected to said first indicator and a second switching device connected to said second indicator; and said power supply means comprises a first power supply connected to said first switching device and a second power supply connected to said inverter means.

13. Apparatus according to claim 12, wherein:

said first power supply is an A.C. power line;

said apparatus further comprises a resistor means connected directly between said A.C. power line and said first indicator, the resitor means having a value corresponding to a value of current in the A.C. power line.

14. An apparatus according to claim 12, wherein:

said first switching device comprises a sensitive gate triac and said second switching device comprises a magnetic relay.

15. An apparatus according to claim 14, wherein:

said second power supply is also connected to said second switching device.

16. An apparatus according to claim 11, wherein:

said first switching device comprises a sensitive gate triac and said second switching device comprises a solid state relay.

17. Apparatus according to claim 16, wherein:

said detecting apparatus further includes opto-isolator means connected between said inverter means and said switching means.

* * * * *

UNITED STATES PATENT AND TRADEMARK OFFICE
CERTIFICATE OF CORRECTION

PATENT NO. : 4,849,849

DATED : July 18, 1989

INVENTOR(S) : Zucker et al.

It is certified that error appears in the above-identified patent and that said Letters Patent is hereby corrected as shown below:

Column 1, line 57, change "capacitors" to --capacitor--.

Column 3, line 5, change "capcaitor" to --capacitor--.

Column 5, line 28, change "is" to --it--.

Column 7, line 7, change "prodiving" to --providing--.

In the Abstract, line 6, change "a" to --the--.

Signed and Sealed this

Tenth Day of July, 1990

*Attest:*

HARRY F. MANBECK, JR.

*Attesting Officer*

*Commissioner of Patents and Trademarks*

UNITED STATES PATENT AND TRADEMARK OFFICE
CERTIFICATE OF CORRECTION

PATENT NO. : 4,849,849

DATED : July 18, 1989

INVENTOR(S) : Zucker et al.

It is certified that error appears in the above-identified patent and that said Letters Patent is hereby corrected as shown below:

Column 1, line 57, change "capacitors" to --capacitor--.

Column 3, line 5, change "capaitor" to --capacitor--.

Column 5, line 28, change "is" to --it--.

Column 7, line 7, change "prodiving" to --providing--.

In the Abstract, line 6, change "a" to --the--.

Signed and Sealed this

Sixteenth Day of July, 1991

*Attest:*

HARRY F. MANBECK, JR.

*Attesting Officer*

*Commissioner of Patents and Trademarks*